(12) United States Patent
Sanders et al.

(10) Patent No.: US 8,118,276 B2
(45) Date of Patent: Feb. 21, 2012

(54) VALVE ACTUATORS

(75) Inventors: Peter George Sanders, Bath (GB); Hemendra Parakrama Bandara Dassanayake, Dagenham (GB); Andrew Mark Withers, Chippenham (GB)

(73) Assignee: Rotork Controls Limited (GB)

( * ) Notice: Subject to any disclaimer, the term of this patent is extended or adjusted under 35 U.S.C. 154(b) by 554 days.

(21) Appl. No.: 12/307,823

(22) PCT Filed: Jul. 9, 2007

(86) PCT No.: PCT/GB2007/002531
§ 371 (c)(1),
(2), (4) Date: Apr. 6, 2009

(87) PCT Pub. No.: WO2008/007058
PCT Pub. Date: Jan. 17, 2008

(65) Prior Publication Data
US 2009/0230338 A1  Sep. 17, 2009

(30) Foreign Application Priority Data
Jul. 10, 2006  (GB) .................................. 0613662.6

(51) Int. Cl.
*F16K 31/02* (2006.01)
(52) U.S. Cl. ................ 251/129.04; 251/129.11; 134/554
(58) Field of Classification Search .............. 251/129.04, 251/129.03, 129.05, 129.11, 129.12, 129.13; 137/554
See application file for complete search history.

(56) References Cited

U.S. PATENT DOCUMENTS

| 3,921,264 A | 11/1975 | Madonian et al. | |
|---|---|---|---|
| 4,445,075 A | 4/1984 | Fry | |
| 4,527,217 A | 7/1985 | Muller-Girard et al. | |
| 4,694,390 A * | 9/1987 | Lee | 700/45 |
| 4,759,386 A * | 7/1988 | Grouw, III | 137/554 |
| 4,807,501 A * | 2/1989 | Leigh et al. | 82/148 |
| 4,816,987 A * | 3/1989 | Brooks et al. | 700/45 |
| 4,882,937 A * | 11/1989 | Leon | 73/862.628 |
| 4,926,903 A * | 5/1990 | Kawai | 137/554 |
| 4,995,363 A * | 2/1991 | Terazawa et al. | 123/399 |
| 5,073,091 A | 12/1991 | Burgess et al. | |
| 5,142,906 A * | 9/1992 | Smith | 73/168 |

(Continued)

FOREIGN PATENT DOCUMENTS

CN  2325665 Y  6/1999

(Continued)

OTHER PUBLICATIONS

International Search Report for related PCT applications.

(Continued)

*Primary Examiner* — John Fristoe, Jr.
*Assistant Examiner* — Matthew W Jellett
(74) *Attorney, Agent, or Firm* — Quarles & Brady LLP

(57) ABSTRACT

A valve actuator having an electric drive motor with a motor shaft and having an output shaft linked to the motor shaft to drive movement of a valve, the actuator further having a control system arranged to provide a first closed loop control of the actuator output shaft and including a controller coupled to a first position sensor to sense the position of the actuator output shaft, and to a second position sensor to sense the position of the motor shaft and to enable determination of the speed of the motor shaft, the control system being configured to respond to sensed signals from the first and second sensors and adjust the motor speed/position accordingly.

15 Claims, 10 Drawing Sheets

U.S. PATENT DOCUMENTS

| | | | |
|---|---|---|---|
| 5,422,808 A | 6/1995 | Catanese, Jr. et al. | |
| 5,431,182 A | 7/1995 | Brown | |
| 5,432,436 A | 7/1995 | Leon et al. | |
| 5,503,045 A | 4/1996 | Riester | |
| 5,568,022 A | 10/1996 | Tranovich | |
| 5,680,878 A * | 10/1997 | Chouinard, Jr. | 137/1 |
| 6,100,655 A | 8/2000 | McIntosh | |
| 6,471,182 B1 * | 10/2002 | McIntosh | 251/129.12 |
| 6,612,331 B2 * | 9/2003 | Cederstav et al. | 137/487.5 |
| 2001/0048089 A1 * | 12/2001 | Clark et al. | 251/129.11 |
| 2002/0121618 A1 * | 9/2002 | Williges | 251/129.04 |
| 2003/0024505 A1 * | 2/2003 | Anschicks et al. | 123/399 |
| 2003/0136929 A1 * | 7/2003 | Clemens et al. | 251/129.04 |
| 2003/0155542 A1 * | 8/2003 | Ito | 251/129.04 |
| 2004/0129909 A1 * | 7/2004 | Wiese | 251/129.04 |
| 2004/0134665 A1 | 7/2004 | Greeb et al. | |
| 2005/0184265 A1 | 8/2005 | Aoki et al. | |
| 2005/0247351 A1 * | 11/2005 | Kubota et al. | 137/554 |
| 2006/0016427 A1 * | 1/2006 | Uda et al. | 123/399 |
| 2006/0102864 A1 * | 5/2006 | Bria et al. | 251/129.13 |
| 2008/0048653 A1 * | 2/2008 | Sanders | 324/207.25 |
| 2009/0194721 A1 * | 8/2009 | Watanabe et al. | 251/129.04 |

FOREIGN PATENT DOCUMENTS

| | | |
|---|---|---|
| CN | 1776856 A | 5/2006 |
| DE | 19600110 A1 | 7/1997 |
| EP | 0287299 A2 | 10/1988 |
| EP | 0393697 A2 | 10/1990 |
| EP | 0656500 A1 | 6/1995 |
| EP | 0660095 A2 | 6/1995 |
| EP | 0730114 A1 | 9/1996 |
| EP | 0903522 A2 | 3/1999 |
| GB | 2192504 A | 1/1988 |
| GB | 2196494 A | 4/1988 |
| GB | 2318630 A | 4/1988 |
| GB | 2212947 A | 8/1989 |
| GB | 2255866 A | 11/1992 |
| GB | 2266942 A | 11/1993 |
| GB | 2438024 A | 11/2007 |
| JP | 55069375 A | 5/1980 |
| JP | 5936808 | 2/1984 |
| JP | 1058889 A | 8/1987 |
| JP | 11111364 A | 4/1999 |
| JP | 2003048136 | 2/2003 |
| JP | 2005214299 A | 8/2005 |
| SU | 922002 A1 | 9/1980 |
| WO | 97/21154 A1 | 6/1997 |
| WO | 01/16656 A1 | 3/2001 |
| WO | 02/48813 A1 | 6/2002 |
| WO | 03/042586 A1 | 5/2003 |
| WO | 2007/134053 A2 | 11/2007 |

OTHER PUBLICATIONS

UK Search Report for related Great Britain applications.

* cited by examiner ive application of International Application PCT/GB2007/002531 filed 9 Jul. 2007, which claims the benefit of Great Britain Patent Application 0613662.6 filed 10 Jul. 2006, which are incorporated herein by reference in their entirety for all purposes.

VALVE ACTUATORS

CROSS REFERENCE TO RELATED APPLICATIONS

This application represents the national stage application of International Application PCT/GB2007/002531 filed 9 Jul. 2007, which claims the benefit of Great Britain Patent Application 0613662.6 filed 10 Jul. 2006, which are incorporated herein by reference in their entirety for all purposes.

FIELD OF THE INVENTION

The present invention concerns improvements in and relating to valve actuators, and is particularly, but not necessarily exclusively, applicable to control valve actuators, being actuators for the control of valves that adjust the flow of fluids in a conduit—commonly, for example, in response to a signal from a process measurement. Such actuators generally need high accuracy and serve to provide continuous coarse and fine adjustment of fluid flow rates in the conduit rather than simply switching flow by completely opening and shutting the conduit.

BACKGROUND TO THE INVENTION

Valve actuators find wide application, for example in the thermal and hydraulic power generation industries, in oil and gas extraction, marine, water utility and chemical processing industries. For the majority of these purposes the actuators are necessarily powerful and adapted to provide output levels of from about 3Nm to of the order of 1200Nm for rotary outputs or 100N to 30,000N for linear outputs. The valve actuators may be pneumatic, hydraulic, electric, and electro-hydraulic driven but are mainly pneumatic driven since these are less expensive to build to the required level of operational accuracy and reliability. The valve actuators generally all have processor control for setting, monitoring and controlling the actuator. Key control factors include actuator position, i.e. valve position, and actuator torque (primarily for rotary output actuators) and thrust (primarily for linear output actuators). In a rotary output actuator, for example, valve position is typically determined by counting the revolutions or part of a revolution of the driven rotary output shaft by a rotary encoder. The load generated at the actuator output shaft in such an actuator is typically determined by mechanical means, such as by a strain gauge or by a pressure transducer. Load might also be determined from a torque related current in the motor. Examples of latter such mechanisms are described in U.S. Pat. No. 4,288,665 and GB 2,101,355.

In addition to the above features, the valve actuators generally also have facility for failsafe if, for example, there is an electrical power failure. To this end, the majority of actuators further incorporate a compression spring return mechanism to restore the actuator to the desired failsafe position. This does, however, require use of a relatively high amount of power just to overcome the force of the return spring for normal operation.

An alternative approach is the use of stored electrical energy to supply enough power to drive a valve to a failsafe position under power failure conditions. Examples of this approach are disclosed in U.S. Pat. Nos. 5,278,454, 5,744,923 and GB-A-2192504.

A number of factors undermine efficient and effective operation of the valve actuator in normal use and these include gear wear, controller saturation, wind up and overshoot. The latter factors, that may be referred to as "stick-slip" factors, are commonly encountered with valve actuators and can prove a major impediment to maintaining efficiency in the closed loop processes implemented by control valve actuators, where rapid and often very small adjustments are required to be made to the valve position in order to maintain process control. The controller must firstly generate significant power to produce the required break away thrust or torque and then must rapidly attempt to control the valve into position. To overcome an initial heavy load, the controller will often be driven into saturation and, therefore, wind-up action (where the controller gives full power but the load instantaneously disappears and the controller is still fully powered) which will give rise to the valve overshooting its desired position and causing control loop instability.

Pneumatic driven valve actuators are, in common with the other valve actuators, mostly spring return for failsafe on loss of power and consequently are force balanced systems where the air pressure is matched to balance the spring force, valve stem friction, and valve stem force. This can lead to stick slip problems as when the air pressure is raised or lowered to move the valve by a small amount a sudden change in friction can cause the actuator to jump by more than the desired movement. They are also subject to unwanted movements due to changes in valve stem force as this unbalances the forces and the actuator needs to alter the air pressure to compensate.

Electric motor driven valve actuators are stiffer systems than pneumatics and don't suffer as much from changes to stem forces moving them away from their position. Electric motor driven valve actuators also suffer from stick slip problems although less so than pneumatics. However they can suffer from poor control due to backlash in the drive train. The motor needs to take up the backlash when reversing direction before the output starts to move. With a conventional system with one sensor at the output the controller will increase the motor speed, as it sees no movement at the output, and then when the backlash is taken up the output will suddenly overshoot especially if all that was required was a small movement. On current electric actuators the main approach to overcome this is to keep the backlash to a minimum by using high grade gears and a low gear ratio, often with an overpowered, high cost stepper (synchronous) motor. This and the long life requirements due to continuous operation make the drive train very expensive.

It is amongst objectives of the present invention to provide a control valve actuator that differs from and, suitably, improves upon the known such actuators and mitigates one or more of the aforementioned or hereinafter discussed operational difficulties.

SUMMARY OF THE INVENTION

According to a first aspect of the present invention, there is provided a valve actuator having an electric drive motor with a motor shaft and having an output shaft linked to the motor shaft to drive movement of a valve, the actuator further having a control system arranged to provide a first closed loop control of the actuator output shaft and including a controller coupled to a first position sensor to sense the position of the actuator output shaft, and to a second position sensor to sense the position of the motor shaft and to enable determination of the speed of the motor shaft, the control system being configured to respond to sensed signals from the first and second sensors and adjust the motor speed/position accordingly. Suitably the controller cycles at a rate that is at least five times greater than the bandwidth of the electric motor and preferably the controller is arranged to sample the first and/or second sensor with a period less than one tenth of the mechanical time constant of the actuator.

By using the two sensors for feedback control and thereby overcoming the stick-slip problems a high level of control accuracy and reliability is achieved while avoiding the need for expensive high grade, low backlash gears. Accordingly, with careful selection of materials and design to get the required life, it is now possible to produce a low cost drive train with an excellent level of accuracy.

Preferably the sensitivity (i.e. sensor counts per extent of working travel of the motor shaft) of the second (motor) sensor is high such as to control the output shaft speed to within at least two, and preferably at least one percent of the full operating speed of the output shaft.

The controller is configured to cycle at a rate that is at least five times greater than the bandwidth of the electric motor. As will be appreciated, the bandwidth of_ the electric motor is related to the rate in which the motor builds up to its steady state speed, given a transient input or load condition. This is often depicted by a first order approximation of a change in speed in response to a unit step input. In a first order system the steady state (99% of final value) is reached within five time constants and in one time constant such a system reaches 63% of steady state value (speed).

The output sensor sensitivity is suitably of the order of 0.025% of a full travel of the output shaft, i.e. 4,000 counts to a full travel of the output shaft. The motor sensor sensitivity is suitably at least 100 times greater than the output sensor sensitivity and, for example, generates 323 counts corresponding to every single count on the output sensor.

Preferably the controller incorporates a position control loop, designed to maintain the actuator output position at a desired setpoint. Within the position control loop is a second loop having a proportional-integral-derivative controller (PID controller) that maintains motor speed to an internally derived desired value. A position error occurs when the demand position changes or a load disturbance changes the output position. The controller receives signals from both the output shaft and motor position sensors and computes corrective action to the motor drive signal from a computation based on the error (proportional), the sum of all previous errors (integral) and the rate of change of the error (derivative).

In accordance with a second aspect of the present invention, there is provided a linear output valve actuator comprising an electric motor drive coupled suitably to a linearly moving output shaft of the actuator, the output shaft terminating in a thrust transducer having a generally central portion of a first sleeve coupled to the output shaft, and the first sleeve having an outer annulus couplable directly or indirectly to a valve to be actuated, the first sleeve further including a web of reduced thickness material linking the said central portion to the outer annulus and being arranged to flex in response to force applied between the central portion and the outer annulus, the transducer including at least one strain gauge mounted on the web and arranged to sense strain in the web as it flexes and thereby in use, providing an indication of thrust applied by the output shaft to a valve to be actuated.

Typically, the first sleeve houses electronic components for pre-conditioning signals received from the or each strain gauge and the signal from the or each strain gauge may be carried along a signal conductor passing through the inside of the output shaft. This provides advantages because cables do not need to be routed outside the actuator via sealing glands or the like and are thus within the protection of the enclosure.

A further aspect of the invention provides a valve actuator having an electric drive motor with a motor shaft and having an output shaft linked to the motor shaft to drive movement of a valve, the actuator further having a control system comprising a controller to provide closed loop control of the valve the actuator being housed in a housing with a user interface that has a non-intrusive set up sequence and wherein the actuator housing houses a switch which can be triggered to start a set up routine for the control loop by approaching to an external part of the housing a simple non-intrusive un-powered device such as, for example, a magnet.

The switch may, for example, be a Hall or Reed switch. This simplifies the set up task for the user while avoiding risk of sparking from use of an intrusive mechanical device and avoiding the need for the user to have access to a PDA or other wireless control device simply to initiate the set-up. Preferably for safety, the user interface is configured so that on removal of the device from proximity to the switch the start up routine is halted.

In a yet further aspect of the present invention there is provided a valve actuator having an electric motor drive and gear drive train and an output shaft that moves to drive a control valve between varying states of opening for control of rate of flow of fluid in a conduit, the actuator having a locking latch to lock the one or more gears of the gear drive train in one position and thereby give a "stay put on loss of power" feature, wherein the latch is held into engagement with a gear of the drive train by a resilient biasing means and is moved away by an electrical solenoid whereof the solenoid armature pulls the latch out of engagement with the gears against the force of the resilient biasing means, Preferably, the locking latch comprises a first wheel having one or more axially extending locking pins which are engageable with one or more radially extending slots in a permanently driven second wheel, the first and second wheels being rotatable in parallel planes and the plane of the first wheel being moveable towards the plane of the second wheel into a locking position under action of the biasing means when the solenoid is de-energised thereby to cause entry of a locking pin into a slot.

The first wheel may further include drive means such as a splined shaft, which permits manual rotation of the first wheel, the rotation being transmitted via the or each locking pin to the second wheel when the first wheel is in the locking position, and thereby to the output shaft.

The actuator may include a lateral support arrangement for the linear output shaft in which a support arm or prop is adjustably extendible toward the axis of the shaft proximate that part of the shaft that is acted upon by the pinion/gearing of the drive train to maintain the orientation of the axis of the shaft and prevent backlash. Suitably this arm or prop acts against the rack body.

In accordance with a further aspect of the present invention, there is provided a valve actuator having an electric drive motor with a motor shaft and an output shaft linked to the motor shaft to drive movement of a valve, the actuator further having a control system comprising a controller and a torque or thrust sensor to sense the torque or thrust of the output shaft to provide closed loop control of the torque or thrust applied to the valve; and further having a failsafe facility to move the valve to a safe position in the event of mains power supply failure, the failsafe means comprising at least one super/ultracapacitor configured to power the electric motor and the control system and move the valve in a torque-/thrust-controlled manner to the safe position.

This arrangement gives the user a low power consumption, cost effective and fully torque/thrust-controlled arrangement for returning the actuator to the desired failsafe state and effectively allows the user to tailor the failsafe tension to the required level for each installation whereby the valve will re-seat securely without insufficient or excessive force.

Preferably the failsafe power is supplied from one or more ultra-capacitor of value 30 F or greater via a boost converter. The boost converter should provide sufficient voltage to run the motor at the desired failsafe speed and sufficient current to run under full load conditions. Preferably the ultra-capacitors should be charged using a current limited buck converter to a voltage which will provide sufficient energy to perform a full failsafe stroke at full load whilst maintaining the life of the capacitors.

In another aspect, the invention provides a valve actuator having an electric drive motor with a motor shaft and an output shaft linked to the motor shaft to drive movement of a valve, the actuator further having a control system comprising a controller and a torque or thrust sensor to sense the torque or thrust of the output shaft to provide closed loop control of the torque or thrust applied to the valve controller and wherein the controller or a further processor that is operatively linked to the controller periodically logs the actual thrust/torque and this data is available for comparison with historical data/profiles.

BRIEF DESCRIPTION OF THE DRAWINGS

A preferred embodiment of the present invention will now be described by way of example with reference to the accompanying drawings, wherein.

DESCRIPTION OF THE PREFERRED EMBODIMENTS

Figure 1:
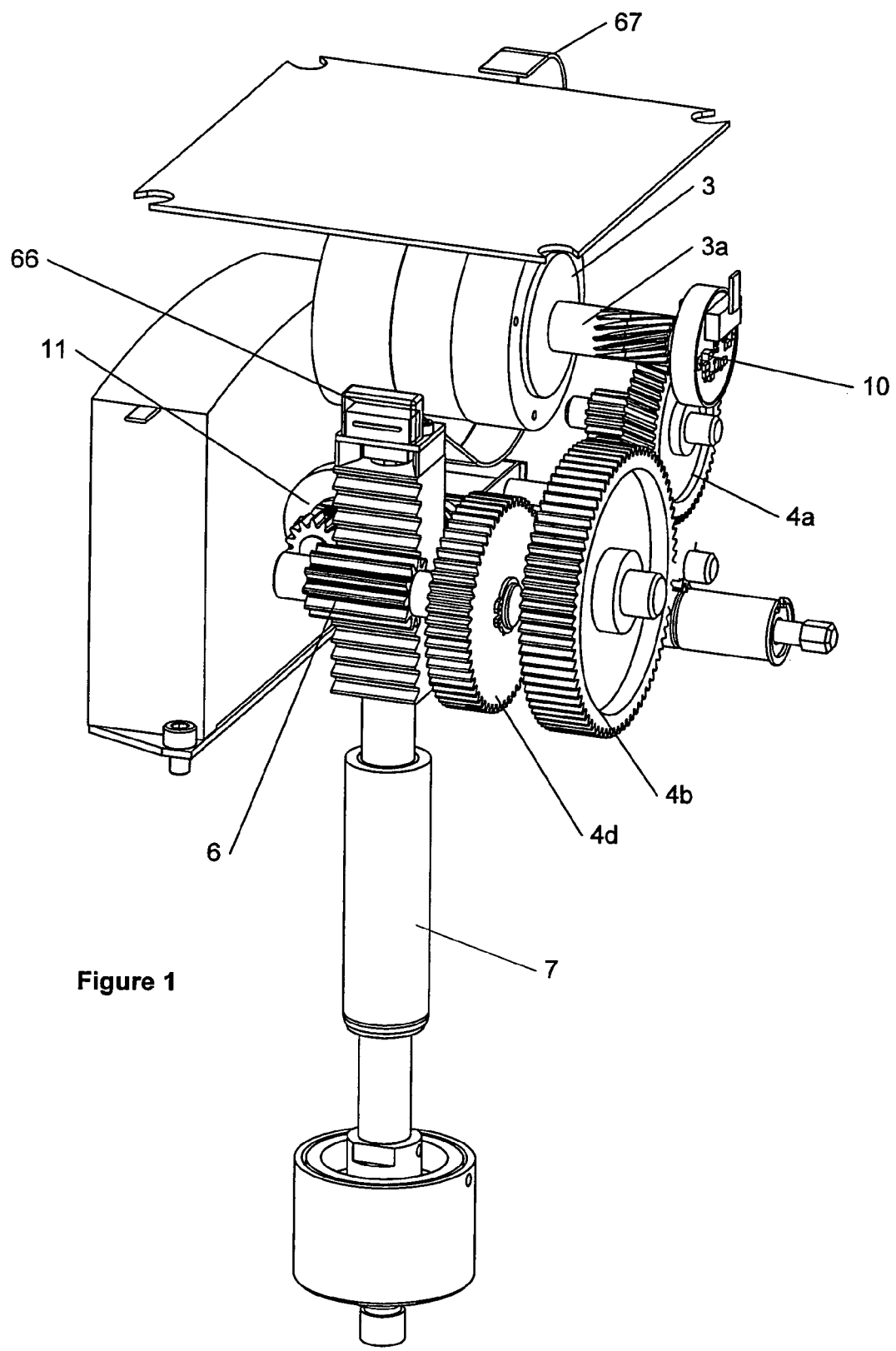
FIG. 1 is a perspective general assembly diagram of the valve actuator.
Figure 2:
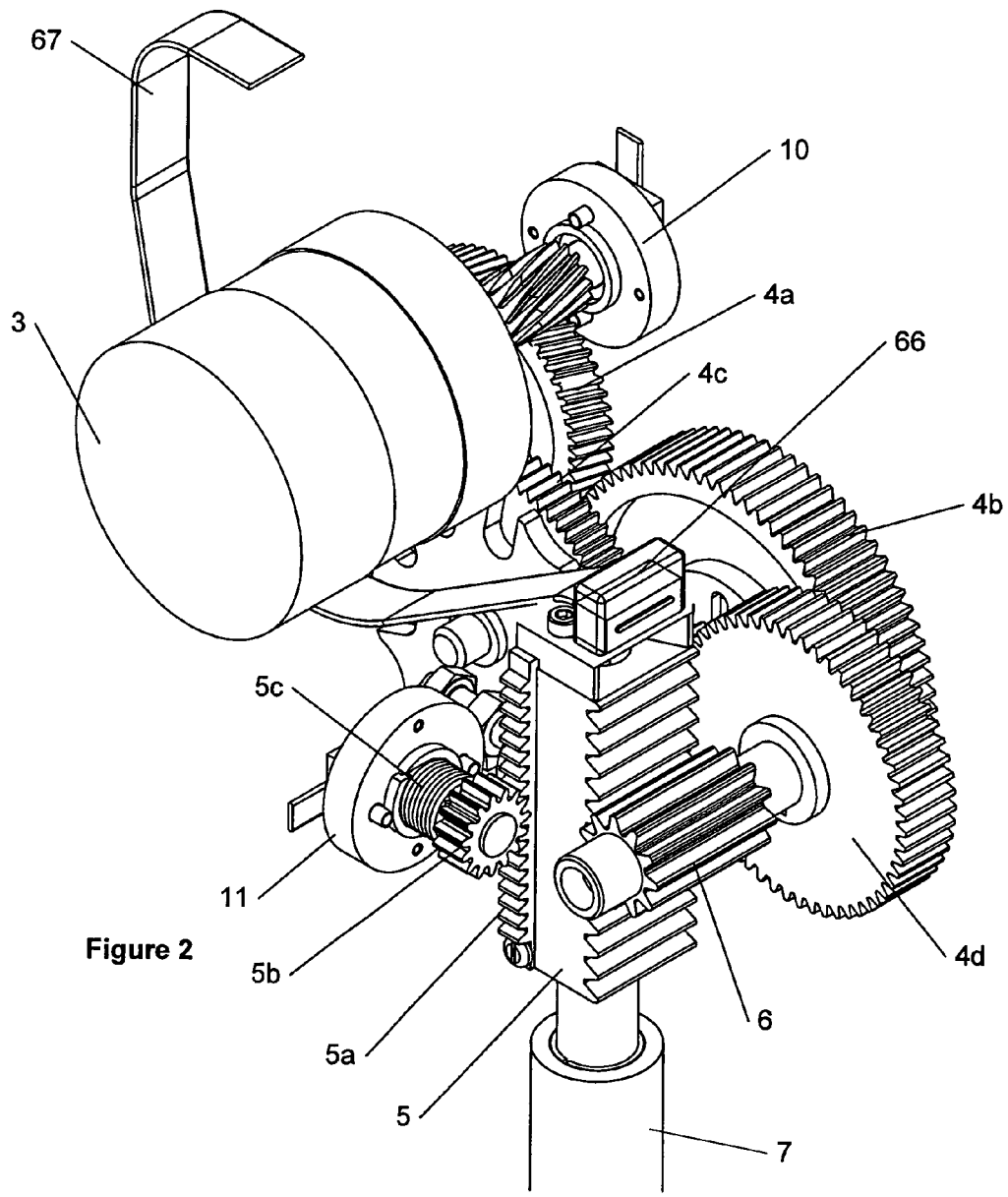
FIG. 2 is a is a perspective general assembly diagram of the valve actuator from a different viewing angle to FIG. 1.
Figure 3:
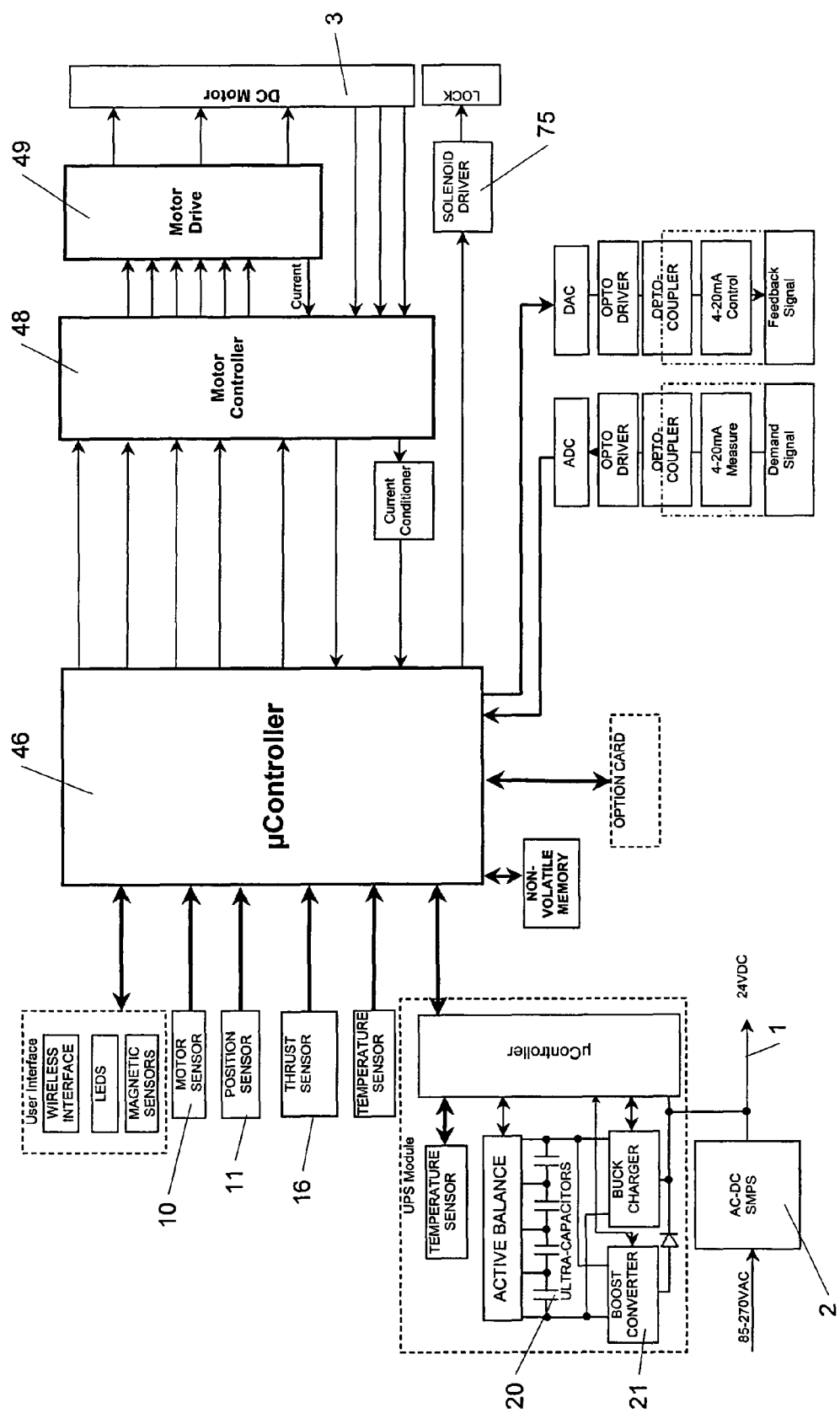
FIG. 3 is a system circuit diagram.

Referring to FIGS. 1 to 4, the system typically includes a DC power supply 1 provided by a switched mode power supply 2 that generates the voltages required for the electric drive motor 3 and electronics. The drive motor 3 of the actuator suitably comprises a permanent magnet DC motor that drives through a spur gear drive train 4a-d to a rack 5 and pinion 6. The rack 5 is coupled to an output shaft 7 of the actuator that provides the linear output required to vary the extent of opening of the control valve. The control valve is not shown in the figures.

The electric drive motor 3 is permanently connected to its power supply 1 with the voltage varied by a motor controller 48 and power drive 49 to move the motor 3 and vary its speed and/or torque.

A first non-contacting digital position sensor 11, that suitably is a rotary/shaft encoder is present adjacent the end of the pinion 6 that drives the actuator output shaft 7 to detect the position of the output shaft 7. The position sensor 11 adjacent the end of the pinion 6 cooperates with a secondary rack 5a mounted on the side of the rack 5 such that when the rack 5 reciprocates in use, the secondary rack 5a correspondingly reciprocates and turns a pinion gear 5b carrying a magnet. The magnet position is monitored using the position sensor 11. A torsion spring 5c ensures that there is no backlash between the driven pinion gear teeth and the teeth on the driving rack 5a. The sensor 11 senses the absolute rotary position of the pinion 5b, i.e. how many turn counts the pinion 5b is away from a reference position such as from the position equivalent to one extreme end of the working travel of the output shaft 7. This rotary position sensor 11 is suitably an absolute rotary/shaft encoder that indicates shaft angular position from a designated datum by unique coded signals.

In an alternative embodiment the position of the output shaft 7 along the linear extent of travel of the output shaft 7, may be sensed by a non-contacting linear position sensor rather than a rotary encoder. Such sensors may be based on magnetic, inductive or optical technology.

A second non-contacting digital position sensor 10 is located adjacent the end of the drive shaft 3a of the motor 3 to sense the rotary position of the drive shaft 3a and thereby determine the speed of rotation of the drive shaft 3a.

The use of the two position sensors 10, 11 to position the unit and prevent overshoot is very important. As noted above, it is perceived that the stick-slip scenarios encountered in control valves are a major deficiency in maintaining efficiency in closed-loop processes. Often minor adjustments are required to be made to the valve position in order to maintain process control. Firstly, the controller 9 must dictate a significant power level to produce the required breakaway thrust/torque and then rapidly attempt to control the valve into position. Often the controller 9 is driven in to saturation (therefore, wind-up action) to over come the heavy load and then the valve overshoots the desired position, causing control loop instability. To overcome this situation the control system utilises the following feedback states:

Absolute output shaft position of the actuator
Motor shaft position

The two sensors 10, 11 effectively combine to make a "super sensor" that not only detects small changes in the output shaft 7 but also any movement in the motor shaft 3a.

The system design is such that the motor shaft sensor 10 exhibits a high level of sensitivity to even a very small movement/deviation of the output shaft 7. The digital control loop used for the motor speed is a PID controller 9 running at a speed, which is typically an order of magnitude e.g. 5 times the bandwidth (i.e. 5 times faster than the mechanical time constant) of the prime mover/DC motor 3. Due to the speed of the control loop and motor shaft sensor 10 sensitivity; the motor speed can be measured and controlled without noticeable change at the output sensor 11. To further enhance the characteristics of the controller 9 the following implementation is utilised: Two control loops are provided—a valve positioning control loop 11a based on the output sensor 11 and a high resolution motor speed control loop 10a based on the motor sensor 10.

A reference speed demand is generated by the valve positioning loop 11a. For a short distance of travel the demand speed is lower and a high value for longer movements. Therefore when required to travel a very short distance under breakaway condition, the speed controller encounters a large speed negative error, due to the high sensitivity of the speed measurement, which drives the controller out of saturation. This system thus does not suffer from valve stick-slip problems, effectively producing a windup free controller.

The control system may be enhanced by generating the demand speed value with reference to a known mechanical backlash in the gear train and any other components coupling the motor 3 to the output shaft 7. As is described below, this backlash may be monitored and calculated using the two sensors 10 and 11. Once a value is known, the demand speed may be deliberately increased when it is known that the motor direction is being reversed (a situation in which it will be understood that backlash will be a factor). Thus the backlash may quickly be taken up and the demand speed then reduced (e.g. when a known distance has been traveled by the motor output shaft 3a) as drive is taken up on the valve via the gear train and output shaft 7.

This provides a much enhanced settling time for the output shaft control loop since the effect of mechanical backlash in the output shaft loop can be neutralised with suitable motor demand speed calculations and adjustments in the motor speed loop. Thus the control system set out in FIG. 4 includes a backlash calculation device 12 which feeds a backlash value into the motor speed profile calculator 14 which in turn generates the demand motor speed value.

Since the arrangement has one position sensor 10 at the start of the gear train 4a-e, 5, 6 and one position sensor 11 at the end there will be a relationship between the output position of the sensors 10,11. This may be used to measure the backlash within the drive train by looking at the amount of change in position of the motor sensor 10 to start to move the output sensor 11 when reversing direction. An increase in backlash would indicate wear occurring in the drive train 4a-d, 5, 6. In systems where the drive train was always preloaded in one direction and so backlash wasn't present it would still be possible to measure increase in wear. This could be achieved by looking at the output from the motor encoder 10 at a specific position of the output encoder 11. If this relationship changed then this would be due to wear in the drive train.

Figure 5:
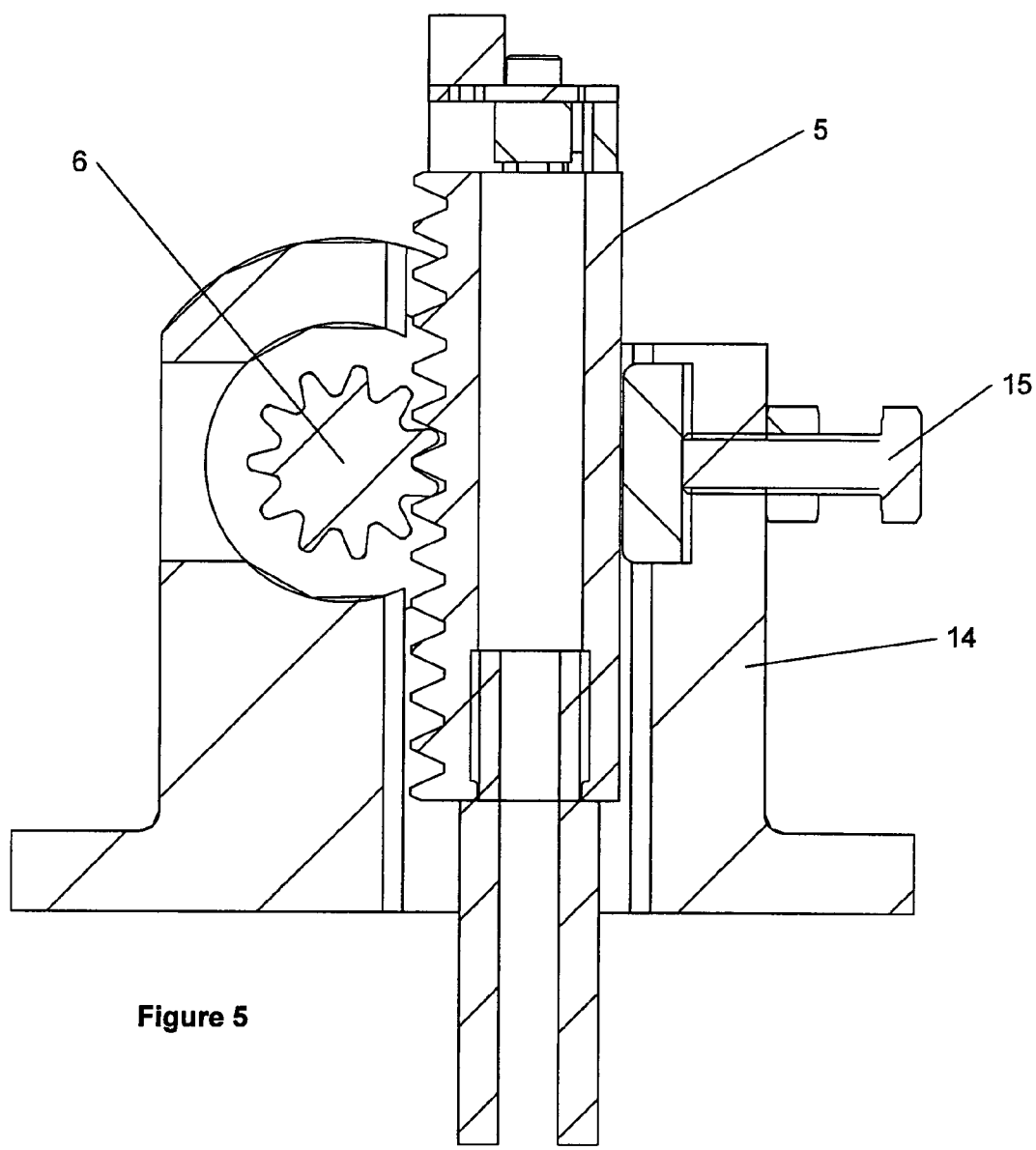
FIG. 5 is a view of the output shaft and rack and further showing a support element adjacent the shaft to steady it.

The rack 5 and output shaft 7 assembly are (as shown in FIG. 5) supported in a housing 14 and also by an adjustable/extendible support arm/prop 15 opposite the point of contact between the pinion gear 6 and the rack 5. The support is adjustable to remove backlash between the rack 5 and pinion 6 mesh. Supporting at this point also removes the need for the shaft 7 to protrude from the top of the rack 5 which would make the assembly larger.

Figure 6:
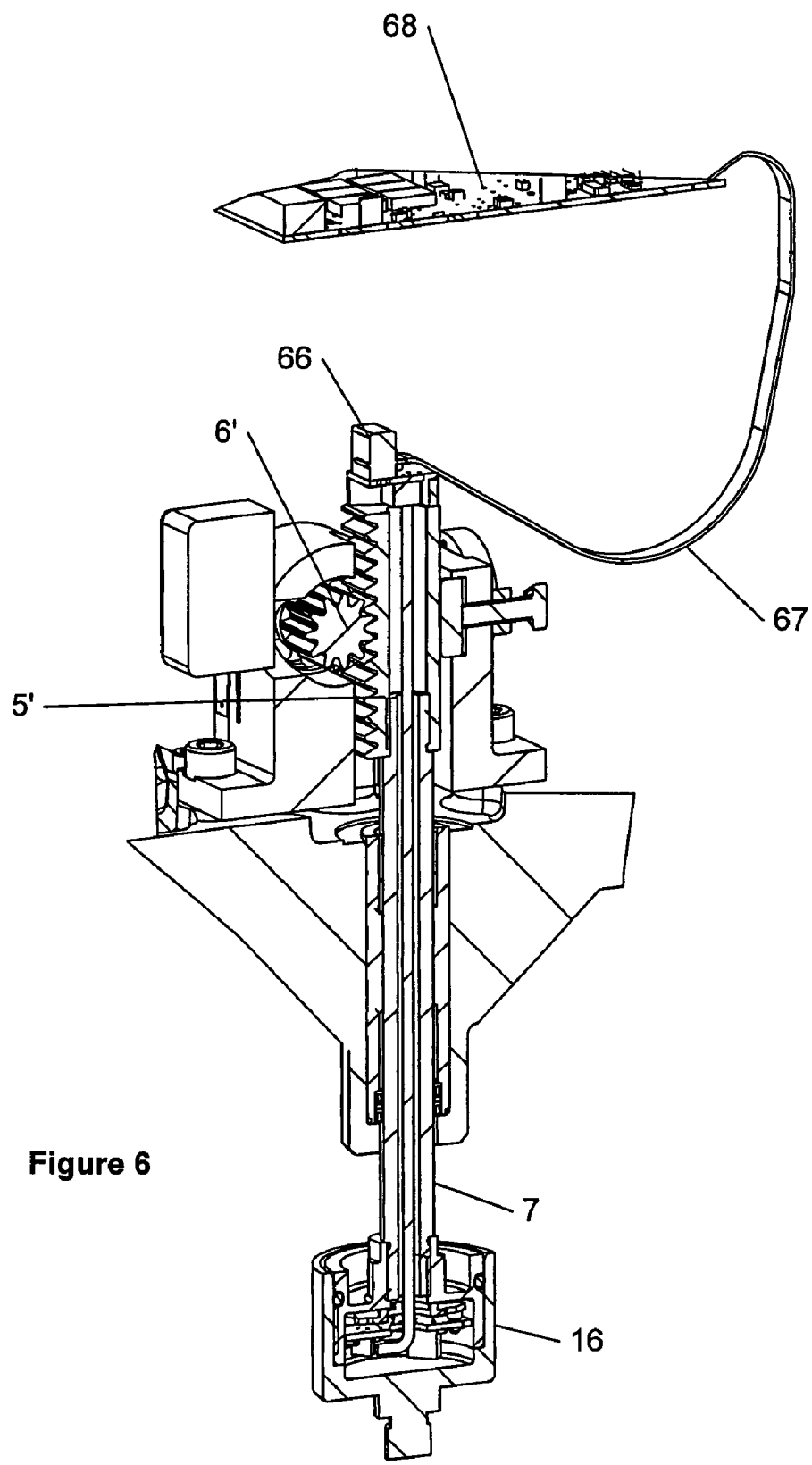
FIG. 6 is a cut-away view of an actuator including a thrust transducer in accordance with the invention.
Figure 7:
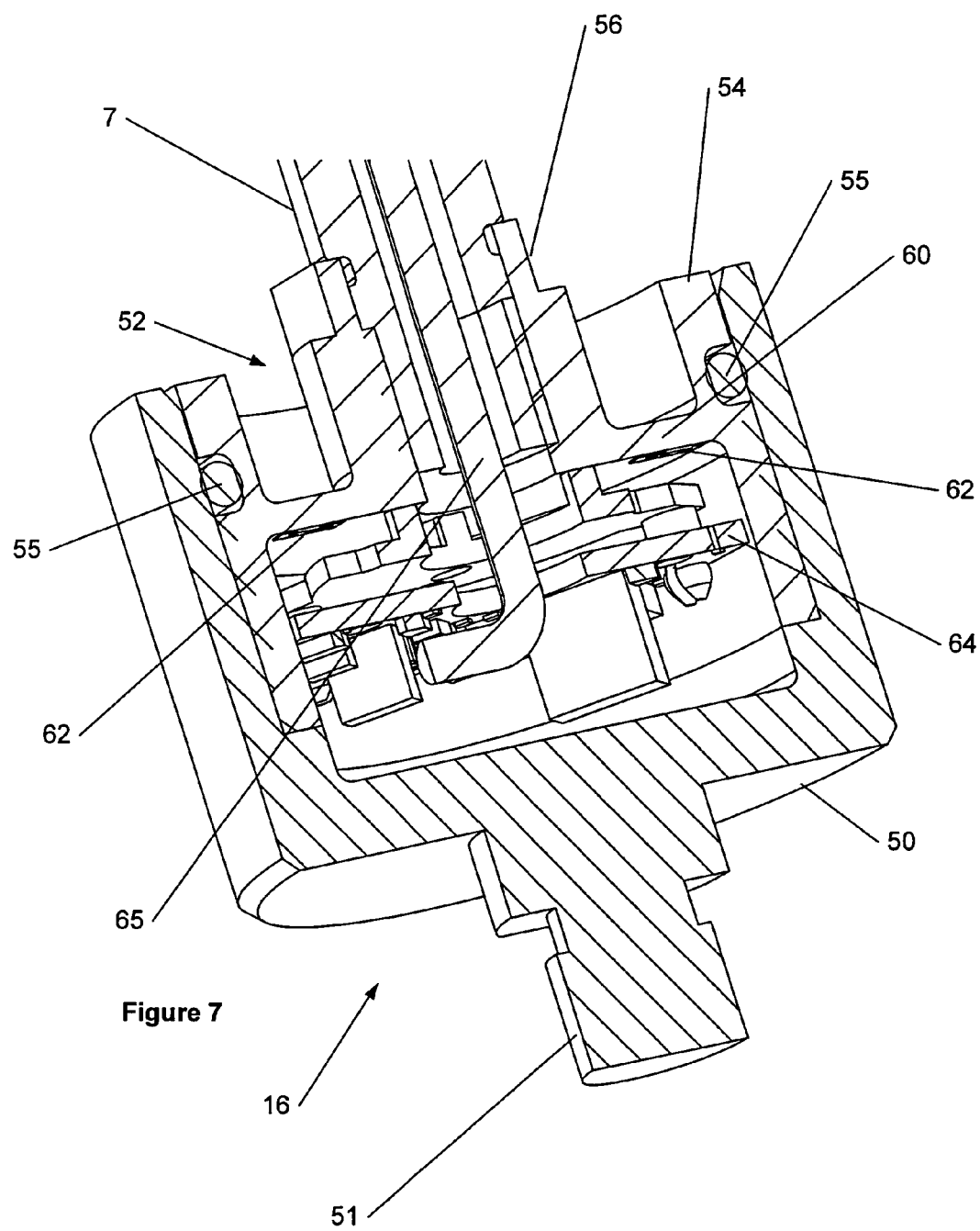
FIG. 7 is an enlarged section of a thrust transducer in accordance with the invention.

With reference to FIGS. 6 and 7, the measurement of thrust produced by the actuator may be achieved using a transducer 16 mounted on the end of the actuator output shaft 7. With particular reference to the sectional view of FIG. 6 and the enlarged view of FIG. 7, the shaft 7 is driven linearly via the rack and pinion arrangement 5 and 6. Drive to the valve is transmitted via an outer sleeve 50 which terminates in a valve-coupling boss 51. Drive from the motor (not shown in FIGS. 6 and 7) is transmitted to the outer sleeve 50 via an internal sleeve 52.

The inner sleeve 52 includes an external annulus 54 which is threaded and engages the internal threaded surface of the outer sleeve 50 and is sealed to the sleeve 50 by O-ring 55, a generally central coupling point 56 which is fixed to a substantially rigid output shaft 7 driven by the rack and pinion arrangement 5 and 6 and a flexible, annular thin-walled web 60 linking the coupling point 56 with the external annulus 54.

As the shaft 7 reciprocates under motor drive, the web 60 flexes. The flexion is measured by strain gauges 62 mounted on the web which thus allows a measurement of force at the point that the actuator is coupled to the valve.

An amplifier PCB 64 in the coupling amplifies the strain gauge outputs and the output signal from the amplifier is fed up into the actuator along a cable 65 fed through a passage formed inside of the output shaft 7.

This provides a very accurate measurement of the force required to move the valve.

Figure 4:
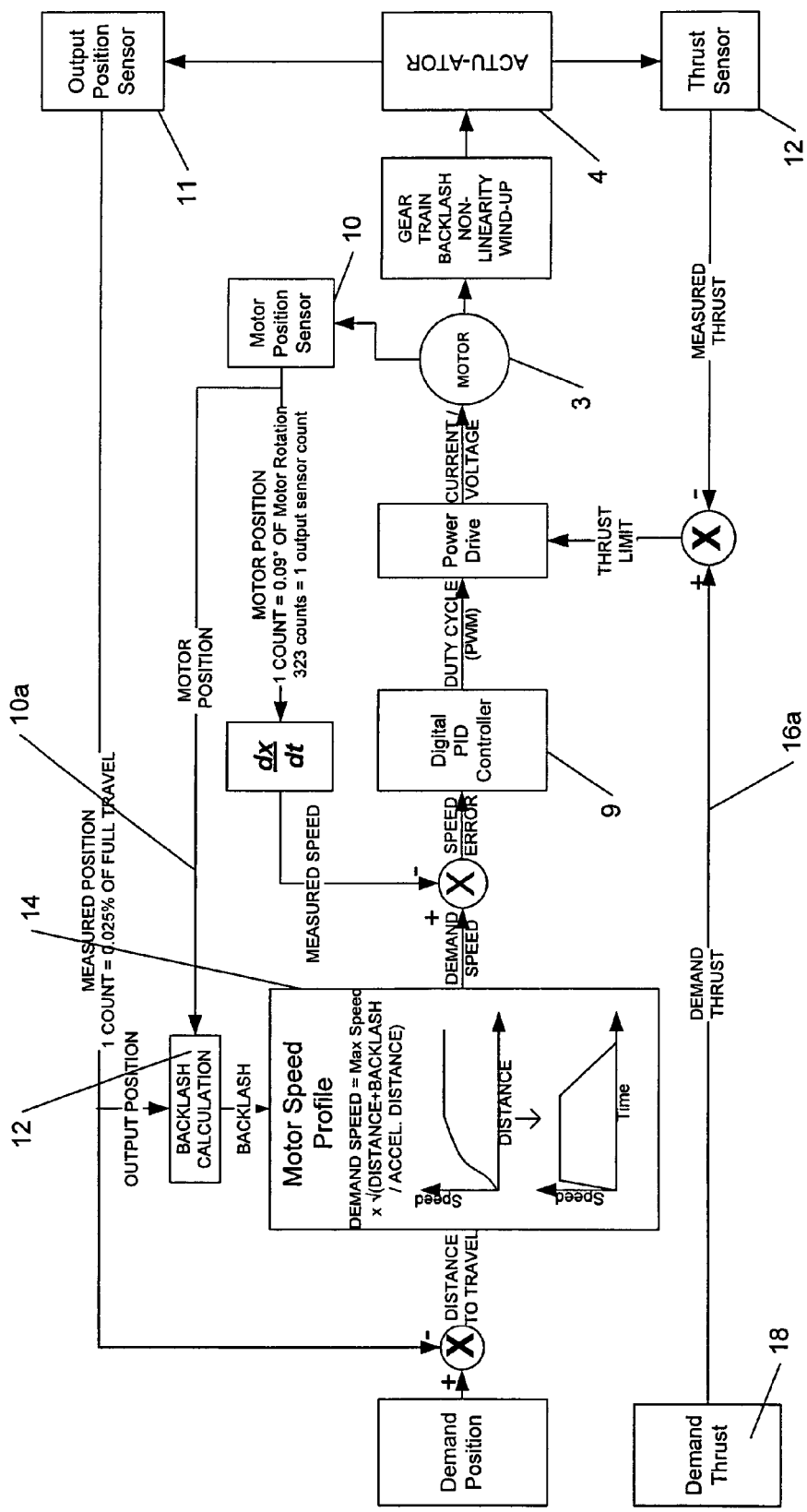
FIG. 4 is a schematic diagram of the control loops of the actuator control system.

The strain gauge 16 output forms the primary feedback in a thrust control loop 16a (FIG. 4). Firstly, an analogue circuit processes the thrust signal to eliminate noise in measurement. This filtered signal is such that it has greater bandwidth than the actuator and is fed into the controller. When the processed thrust measurement from the strain gauge 16 is less than a reference value 18, the motor 3 is allowed to generate maximum power. Where the thrust produced by the actuator reaches the set value 18, the motor current is then limited to a value such that the current is just sufficient (and thus the torque produced by the motor) to hold greater than full load thrust utilising the reverse efficiency of the gears and also the inherent cogging torque of the motor. Therefore the power required to hold a load is a fraction of what is required to move the load. Therefore the thrust control strategy is programmable, accurate and optimised for efficiency. Importantly, thrust control is also implemented in failsafe operation.

Additionally, in the arrangement shown in FIGS. 6 and 7, the sensor gauges, cabling and electronics are integral and within the sealed enclosure of the actuator. This integral aspect is important since valves may be used in hazardous environments and thus actuators may require explosion proof ratings for example. Keeping sensors and connecting wiring within the actuator avoids the need for sealing glands or the like which are known to make appropriate safety ratings harder to obtain and may also lead to issues of cable damage.

In this embodiment, the signal and power wiring passes up through the shaft 7 to a terminal block 66. Signals are then carried internally via a flexible cable 67 to a further PCB 68 in the upper part of the actuator. Reciprocal movement of the shaft 7 is thus accommodated by the flexible cable 67.

Other transducers may be fitted in the sensor assembly formed within the sleeves 50 and 52 such as a temperature sensor, a 'sniffer' to detect volatile materials and/or an accelerometer to measure vibration.

In a further improvement to the arrangement of the control valve actuator, the actuator may have a non-intrusive set up sequence. The actuator body 38 houses a wireless RF short-range receiver and transmitter. This allows non-intrusive communication to and from the actuator. The actuator can be configured (to adjust speed, direction of travel etc.) using a wireless hand held device. The Bluetooth wireless connectivity standard may be used for this purpose. The arrangements described in GB2196494B may also be used and the disclosure of that patent in relation to non-intrusive setting is hereby incorporated by reference.

The actuator can be triggered to start a set up routine by triggering a magnetic sensor inside the enclosure/actuator body using a magnetic device outside the enclosure. The actuator may then run in each direction in turn until it hits the end of valve travel where it will set a limit position. The actuator is able to differentiate between the end of valve travel and its own internal stops, as when hitting its own internal end of travel stops no output of thrust is generated in the transducer 16. This would allow an indication to be made, if for instance the actuator stroke wasn't sufficient for the valve stroke, perhaps because of incorrect adaptation of the actuator to the valve.

Electrical energy is stored in super/ultra-capacitors 20 to move the valve to a safe position in the event of mains power supply failure. All the mechanism and associated electronics is housed in a weatherproof enclosure. A bank of ultra-capacitors 20 (series connection) is charged using the switch mode power supply 2. The total capacitor bank voltage is much less than the voltage required by the motor for normal operation. For instance, if the maximum motor voltage required for normal operation is 24 V the capacitor bank voltage would be about 7 V.

In order to maintain constant speed during power loss operation (i.e. failsafe action), the capacitor voltage is required to be elevated and held constant. A fixed frequency 300 or 500 kHz current mode boost controller or step-up converter 21 is used for this purpose. During the failsafe action, where the capacitor 20 bank provides required power, the boost/step-up converter 21 maintains a steady output voltage for the motor 3 even as the capacitor voltage reduces. Therefore over 70% of the stored energy can be extracted while achieving a controlled failsafe action. The output boost voltage is such that it is less than the normal supply voltage but above what is required for desired failsafe speed.

The actuator gearbox is a highly efficient spur gear drive train taking the drive from the motor 3 to the actuator output 7 coupled to the valve. This high efficiency means that it is not self locking and can be back driven.

Under normal circumstances the motor 3 is powered up and moves the actuator and valve to the desired position. It also holds it there reacting to any forces generated by the valve that may try to back drive the actuator and move it from that position. So the motor provides the self locking required of the actuator.

However, under unpowered conditions, uncontrolled movement of the valve may take place which is generally undesirable. Accordingly, locking mechanisms are provided.

Figure 8:
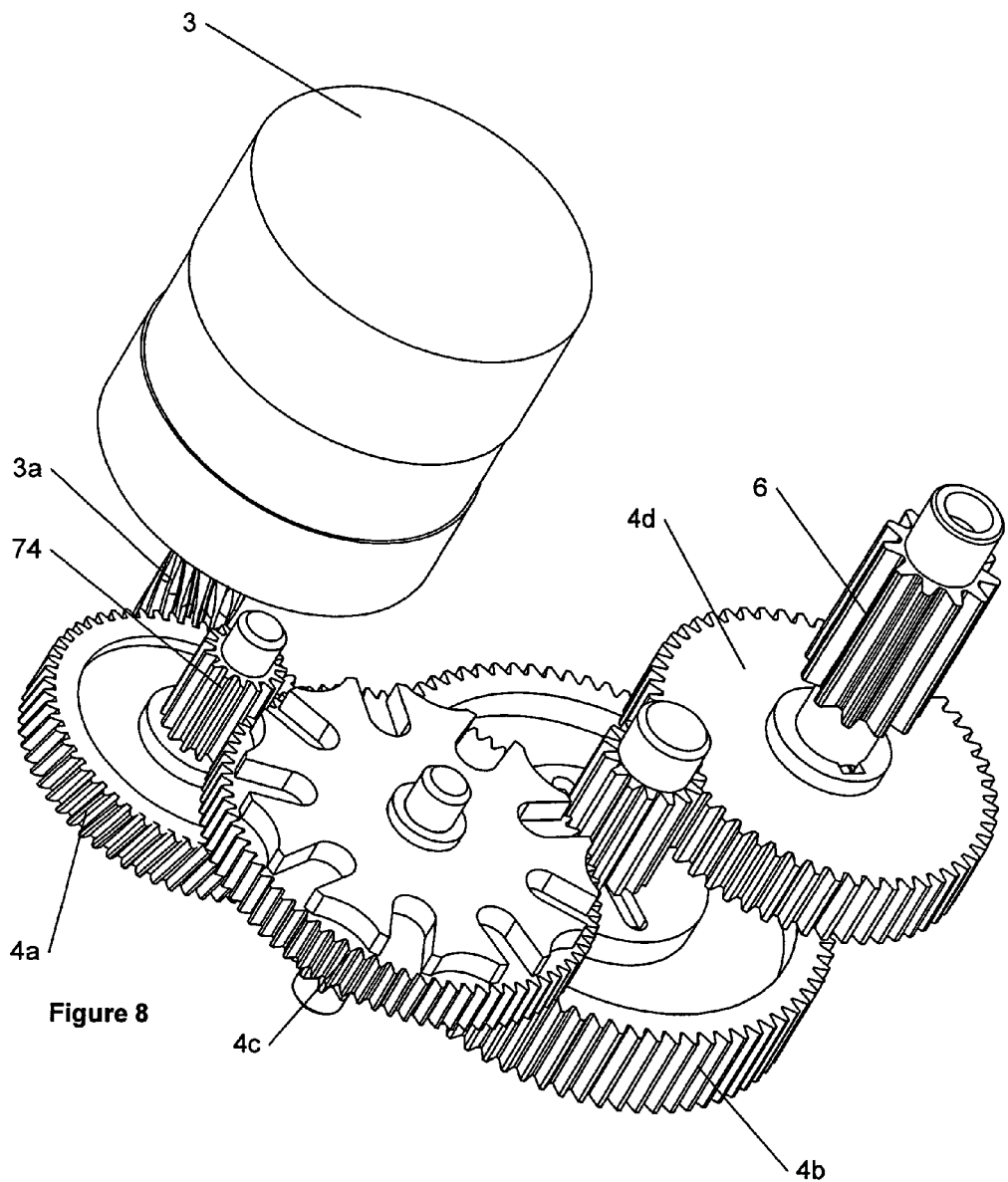
FIG. 8 is a perspective view of a Geneva locking mechanism in accordance with the invention.
Figure 9:
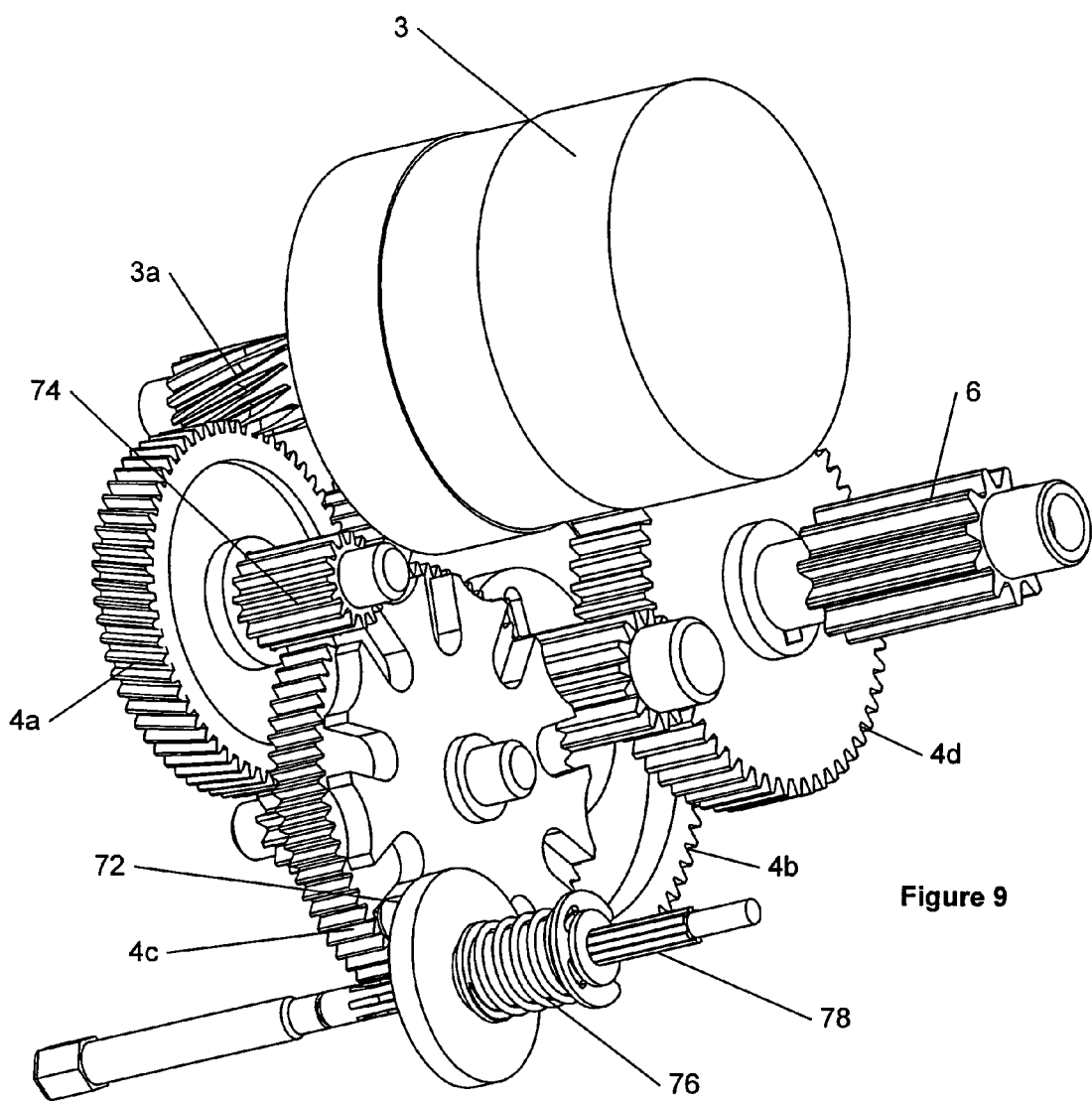
FIG. 9 is an alternative perspective view of the mechanism of FIG. 8.
Figure 10:
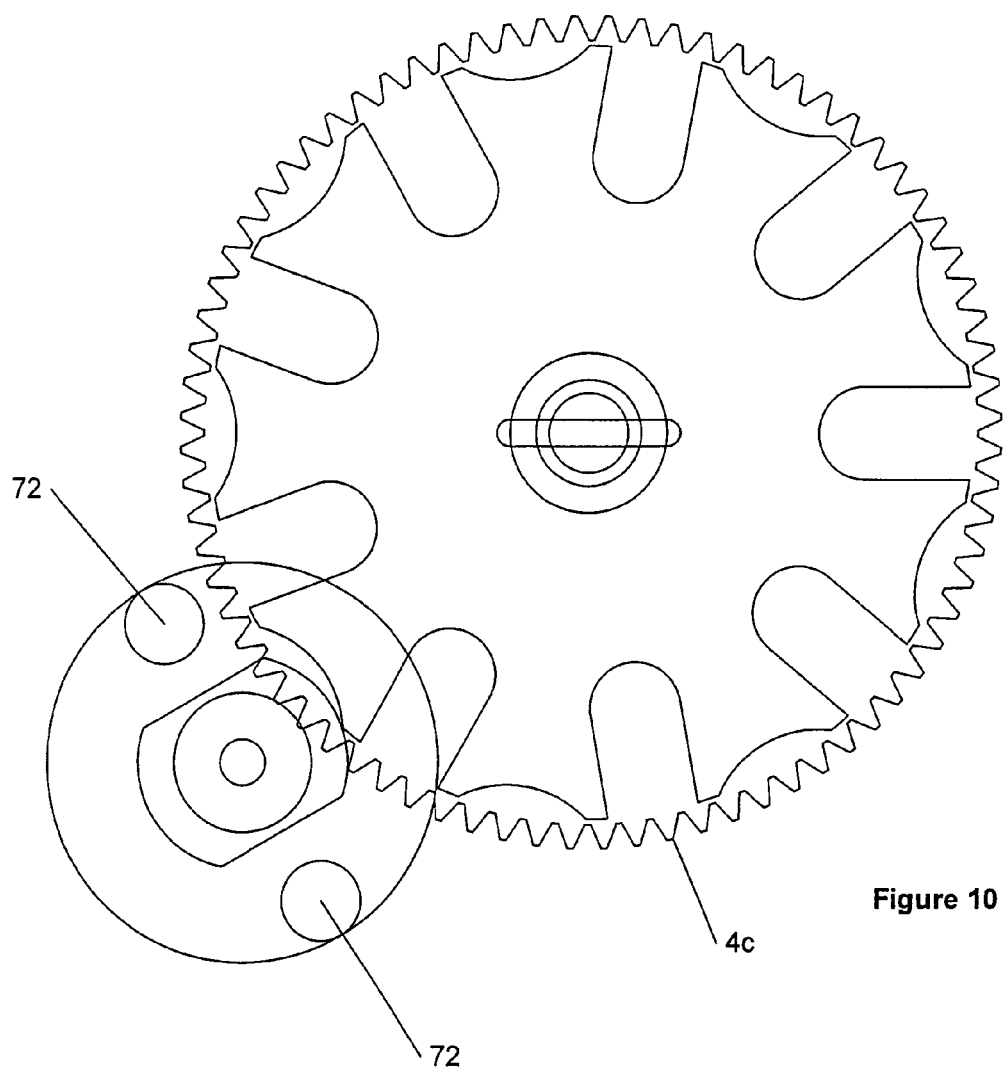
FIG. 10 is a plan view of the mechanism of FIGS. 8 and 9.

With reference to FIGS. 8 to 10 the actuator gearing includes a component 4c having a Maltese cross configuration which cooperates with pins 72 as described in detail below.

The functional requirements are to provide a method of manually operating the actuator when there is no power supply to the motor and also need to ensure that the actuator is self locking when there is no power and so would maintain its position. Whilst a brake may achieve the second requirement, it gives the problem of overcoming the brake to manually drive the actuator.

The Maltese Cross (Geneva) mechanism described below is used to provide an intermittent movement that is locked in position between movements.

The drive to the Geneva mechanism 4c is permanently engaged with one of the gears 74 in the drive train. Engagement of locking pins 72 is selectively achieved using a spring biasing means 76 which is normally held out of engagement by a solenoid (not shown).

Under normal powered conditions the solenoid under solenoid drive 75 (FIG. 3) holds the Geneva mechanism 4c/72 in the disengaged state against the spring 76. If the power to the actuator is removed the solenoid loses its holding force and the spring 76 moves the Geneva drive axially into engagement. As the Geneva mechanism cannot be back driven it locks the actuator in position. However, the Geneva drive can be driven via the drive shaft (from outside the actuator) using splines 78, to move the actuator to a new position. When the power supply to the actuator is restored, the solenoid generates its force to disengage the Geneva drive before the motor is allowed to move the actuator.

The Geneva mechanism may not engage fully when the actuator power supply is removed as the pins 72 may not align with the cross 4c. However when either the manual drive is rotated or the actuator drive train is back driven, the drive will reach a position where the Geneva drive will engage as the pins 72 will line up and the spring will engage the mechanism.

The maximum amount by which the actuator will move before locking is designed to be a small and acceptable amount.

Sometimes it may be required to manually move the actuator when the power supply to the actuator is present. This is achieved by providing a non-intrusive switch on the outside of the actuator that disengages the solenoid power so that this can be achieved. When this switch is activated and the manual drive is engaged the motor is electrically prevented from running. When the switch is de-activated the solenoid will be powered up and disengage the manual drive and allow the motor to take over control.

Sometimes it may be required to manually move the actuator when the power supply to the actuator is present. This is achieved by providing a non-intrusive switch on the outside of the actuator that disengages the solenoid power so that this can be achieved. When this switch is activated and the manual drive is engaged the motor is electrically prevented from running. When the switch is de-activated the solenoid is powered up to disengage the manual drive and allow the motor to take over control. To keep the force required to separate the pins 72 and cross 4c to a minimum, the motor may be automatically rotated backwards and forwards by a small amount when the solenoid is powered up. This helps to release any locked in load on the pins 72 and cross 4c and allows the use of a smaller lower powered solenoid.

This embodiment provides an actuator that automatically engages a manual drive when the main power supply is lost and also locks the actuator in position but still allows manual drive.

In addition to or in alternative to the many innovative features described above, the valve actuator is suitably enhanced by having an electronic controller 46 that provides a feature-rich diagnostic set to facilitate routine and predictive maintenance strategies. The controller 46 is here shown as preferably housed within the actuator body/housing 39 and suitably communicates with an external processor/computer by the wireless interface discussed earlier.

One important variable that is accurately monitored by the controller 46 is the actual output thrust/torque. In equivalent pneumatic controllers the value of torque/thrust is only inferred through input pressure and spring force and in some electric actuators an approximation of the thrust/torque is determined from the motor current. Both of these lead to inaccurate thrust/torque measurement. The controller 46 periodically logs the actual thrust/torque and this data is available for comparison with historical data/profiles. This provides useful diagnosis such as valve seat wear and friction increase due to valve packing. This is explained in more detail below.

Another predictive maintenance aid is the continuous efficiency parameter. Actuator efficiency is derived by input power and output power calculations. Input power is given by current and voltage measurements and output power by thrust/torque, speed and acceleration. Any wear in the gear train and motor due to heavy workload/demand leads to a drop in efficiency of power transfer. Thus monitoring of the efficiency parameter provides an early detection of mechanical wear.

Control statistics such as cumulative time spent in each valve position, number of direction changes and average control errors are suitably also logged. These statistics aid performance monitoring of the process under control.

Failsafe energy storage is also monitored. This is achieved by discharging the ultra capacitors for a short time period through a known load current and estimating the cell capacitance. Hence any degradation of the capacitance and therefore of the failsafe energy storage is diagnosed.

As noted above, two output measurements that the actuator logs are position and thrust. Diagnostics or condition monitoring are carried out using these 2 measurements.

By measuring forces at the valve coupling together with accurate position measurement a superior diagnostic capability is provided.

Examples of monitoring the valve would be that the force required to move the valve is the sum of the stem force generated from the pressure in the valve and the frictional force from the stem packing that seals the valve stem. The stem force will always act in the same direction whereas the friction force will act in both directions. Therefore the friction force adds to the stem force in one direction and subtracts from it in the other. So by accurately measuring the total force in both directions it is possible to calculate the stem force and friction force as separate forces.

Erosion to the valve seat may be monitored by comparing position against the build up of thrust when the valve is moved to the shut position.

The number of movements and where they occur can be monitored. This gives an indication of how well the valve is controlling the process. It may also indicate when valve stem seals require changing.

Accelerometers may indicate vibration caused by cavitation in the valve.

Temperature sensors may indicate leaking valve seals.

With 2 position sensors, one on the motor and one on the output it is also possible to monitor the backlash in the drive train. This is typically a wear indicator.

It is also possible to monitor output position against thrust and number of operations and build up a "work done" chart. This gives an indication of wear within the actuator.

It is also possible to compare the effort put in by the motor to the output thrust produced by the actuator and consequently monitor the efficiency of the drive train which as noted above, may be an indicator of wear.

The design of the electronic controller follows a modular distributed architecture. This allows each module within the controller to communicate its own status/health information. For instance the position sensors transmit information regarding signal strength and validity of measurement. The power module (motor drive) continuously indicates thermal shutdown status, current trip etc. Status indication from each module can be used to isolate faults and thus reduce downtime/repair time.

It will be appreciated that the actuator is not limited to control of fluid valves but may for example be used to control air dampers or the like.

The invention claimed is:

1. A valve actuator comprising:
an electric drive motor with a motor shaft;
an output shaft linked to the motor shaft to drive movement of a valve;
mechanical drive train coupling the motor shaft to the output shaft;
a control system arranged to provide a first closed loop control of the actuator output shaft and including a first position sensor operatively coupled to sense positions of the output shaft, a second position sensor operatively coupled to sense positions of the motor shaft, and a controller coupled to the first and second position sensors and in response to the second position sensor determining a speed of the motor shaft, the control system being configured to respond to sensed signals from the first and second sensors by adjusting at least one of speed and position of the motor shaft, and wherein when the electric drive motor reverses direction, the controller is configured to measure a backlash within the mechanical drive train by reference to an amount of change in position indicated by the second sensor that occurs before a change in position is indicated by the first sensor.

2. A valve actuator as claimed in claim 1, wherein the sensitivity of the first sensor is high such as to control the output shaft speed to within at least two per cent of the full operating speed of the output shaft.

3. A valve actuator according to claim 1 wherein the controller is arranged to sample the first and/or second sensor with a period less than one fifth of the mechanical time constant of the motor.

4. A valve actuator according to claim 1 including a second control loop using the second position sensor and arranged to control the motor speed and wherein the demand speed of the second control loop is generated with reference to a backlash value representative of backlash in the mechanical coupling between the motor and the output shaft.

5. A valve actuator according to claim 1 including a transducer such as a thrust transducer, located at the distal end of the output shaft and wherein the output shaft includes an internal passageway to permit internal routing of communication cabling between the transducer and the main body of the actuator.

6. A valve actuator according to claim 1, wherein the controller in use is configured to measure the wear within the drive train by reference to an output from the second sensor at a specific position of the first sensor.

7. A valve actuator according to claim 1 further comprising the output shaft terminating in a thrust transducer having a generally central portion of a first sleeve coupled to the output shaft, and the first sleeve having an outer annulus couplable directly or indirectly to a valve to be actuated, the first sleeve further including a web of reduced thickness material linking the said central portion to the outer annulus and being arranged to flex in response to force applied between the central portion and the outer annulus, the transducer including at least one strain gauge mounted on the web and arranged to sense strain in the web as it flexes and thereby in use, providing an indication of thrust applied by the output shaft to a valve to be actuated.

8. A valve actuator according to claim 7, wherein the first sleeve houses electronic components for pre-conditioning signals received from each strain gauge.

9. A valve actuator according to claim 7 wherein a signal from each strain gauge is carried along a signal conductor passing through the inside of the output shaft.

10. A valve actuator according to claim 1, wherein the mechanical drive train comprises a plurality of gears coupled to the motor shaft and to a rack and pinion, the rack of the rack and pinion being coupled to or integral with the output shaft.

11. A valve actuator according to claim 1 wherein the mechanical drive train comprises a plurality of gears; and the valve actuator further comprises a locking latch to lock one or more of the plurality of gears in one position and thereby give a "stay put on loss of power" feature, wherein the locking latch is held into engagement with a gear of the mechanical drive train by a resilient biasing means and an electrical solenoid pulls the locking latch out of engagement with the gear against the force of the resilient biasing means.

12. A valve actuator according to claim 11, wherein the locking latch comprises a first wheel having one or more axially extending locking pins which are engageable with one or more radially extending slots in a permanently driven second wheel, the first and second wheels being rotatable in parallel planes and the plane of the first wheel being moveable towards the plane of the second wheel into a locking position under action of the biasing means when the solenoid is de-energised thereby to cause entry of a locking pin into a slot.

13. A valve actuator according to claim 12, wherein the first wheel further includes driver, which permits manual rotation of the first wheel, the rotation being transmitted via each locking pin to the second wheel when the first wheel is in the locking position, and thereby to the output shaft.

14. A valve actuator according to claim 13, wherein driver comprises a splined shaft.

15. A valve actuator according to claim 11, wherein the actuator includes an arrangement of a rack and a pinion, the rack being coupled to the output shaft and the pinion being driven by the electric drive motor, to provide controlled axial reciprocation of the output shaft in use, and wherein the actuator further includes a support arm or prop that is adjustably extendible toward the axis of the output shaft proximate that part of the output shaft that is acted upon by the pinion to maintain the orientation of the axis of the output shaft and mitigate backlash in the rack and the pinion.

* * * * *